United States Patent [19]

Oshikubo

[11] 4,306,670
[45] Dec. 22, 1981

[54] LIQUID DISPENSING DEVICE
[75] Inventor: Yuuji Oshikubo, Sakura, Japan
[73] Assignee: Nichiryo Co., Ltd., Tokyo, Japan
[21] Appl. No.: 51,447
[22] Filed: Jun. 25, 1979
[30] Foreign Application Priority Data
Apr. 19, 1979 [JP] Japan .................. 54-51331[U]
[51] Int. Cl.³ ............................................. G01F 11/06
[52] U.S. Cl. .................................. 222/309; 222/383
[58] Field of Search ................ 222/43, 47, 49, 50, 222/309, 383, 385

[56] References Cited

U.S. PATENT DOCUMENTS

| 2,639,063 | 5/1953 | Yuza ....................... 222/385 |
| 3,283,727 | 11/1966 | Rodrigues ............. 222/309 X |
| 3,574,334 | 4/1971 | Roach ..................... 222/385 |
| 3,729,022 | 4/1973 | Roach ................... 222/383 X |
| 3,940,027 | 2/1976 | Marterer ................. 222/309 |
| 4,072,247 | 2/1978 | Yamazaki ............. 222/309 X |

FOREIGN PATENT DOCUMENTS 201518 12/1954 Australia ........................ 222/385
794916 5/1958 United Kingdom ........... 222/309

Primary Examiner—F. J. Bartuska
Attorney, Agent, or Firm—James E. Nilles

[57] ABSTRACT

A liquid dispensing device including a vertically mounted cylinder, a plunger slidably disposed in the cylinder, a cylindrical space having the inner diameter slightly larger than that of the cylinder being disposed contiguous to the lower end of the cylinder and coaxially therewith to receive the lower end portion of the plunger when the plunger is at the lowermost position a discharge passage communicating with the upper end of the cylindrical space, and a suction passage communicating with the lower end of the cylindrical space.

1 Claim, 5 Drawing Figures

LIQUID DISPENSING DEVICE

BACKGROUND OF THE INVENTION

This invention relates to a liquid dispensing device for dispensing a precise, predetermined small quantity of liquid repeatedly therefrom and, more particularly to a liquid dispensing device of the kind including a housing adapted to be mounted on the top of a liquid container such as a bottle, a cylinder vertically mounted on the housing, a plunger slidably disposed in the cylinder with the upper end thereof projecting out of the upper end of the cylinder, a suction valve disposed in a passage to introduce liquid in the liquid container into the cylinder when the plunger moves upward in the cylinder, a discharge valve disposed in a passage to discharge liquid in the cylinder to the outside when the plunger moves downward in the cylinder, and means for restricting the upward movement of the plunger.

Various liquid dispensing devices of the aforementioned kind have been proposed as shown in e.g. U.S. Pat. Nos. 3574334, 3729022 and 3940027 or the like. However, there are shortcomings such that the construction is complicated thus increasing the manufacturing time and costs, a substantial portion of the device is fabricated of glassware thus having potential breakage, that it is difficult to thoroughly cleanse the dispenser, and it has been required to combine the dispenser with a liquid container having a particular size and the configuration. Further, to adjust the quantity of liquid dispensed from the dispenser there are usually provided a stop adjacent to the plunger to restricting the stroke thereof and, the position of the stop being adjustable along a scale, so that the quantity of the liquid can be changed for each time, however, the accuracy in the quantity will decrease, and in practical usage, it is usually required to reproducibly dispense desired definite quantities. Usually, it is sufficient to change the definite quantity between predetermined two or three quantities.

Further, the prior art dispensers have been generally objectionable in that it has been difficult to bleed air from the interior of the dispenser in starting the operation thus necessitating a plurality of strokes and, air bubbles remaining in the dispenser will results the error in the quantity of the liquid dispensed.

SUMMARY OF THE INVENTION

An object of the present invention is to prevent the shortcomings aforementioned and, according to the invention, a cyclindrical space having the inner diameter larger than that of the cylinder is formed contiguous to the lower end of the cylinder and coaxially with the cylinder, and a transverse passage is formed to connect the inlet of the discharge valve and the upper end portion of the cylindrical space. Thus, any air or air bubbles contained in the cylinder will reliably be exhausted through the normally extending (FIG. 3) transverse passage and through the discharge valve to the outside.

According to one feature of the invention, the housing has an opening normally commmunicating the inside and outside of the liquid container, a flexible discharge tube is connected to the outlet end of the discharge valve and the length of the discharge tube is determined such that the tip end portion of the discharge tube can be inserted into the opening of the housing when the dispensing device is not in use. Whereby, in performing the air discharging operation it is possible to directly return into the liquid container the liquid discharging out of the dispensing device accompanied by the air or air bubbles. Further, it is possible to prevent such problems that liquid in the tip end portion of the discharge tube may vaporize and solidify during a relatively short period of non-use.

According to another feature of the invention, the cylinder is coaxially surrounded by a sleeve with the lower end of the sleeve being secured to the housing, and an annular cap having an annular shoulder on the inner periphery thereof is removably mounted on the upper end of the sleeve, the annular shoulder of the cap acting as a stop restricting the upward movement of the plunger. Preferably, the cylinder is formed of glass and the sleeve and the cap are formed of synthetic resin, whereby, it is possible to prevent the breakage of the glass cylinder. Preferably, a large diameter disc-like shaped member acting as a finger holding grip is mounted between the cap and the sleeve, whereby the dispensing device can be handled by a single hand. Further, the cap may exchangeably selected from a group of caps the location of the shoulders of respective caps being different from one another, whereby, the dispensing device can reproducibly dispense a desired definite quantity for long period of usage and, which quantity can easily be changed by changing the cap.

According to further feature of the invention, the discharge valve and the suction valve are respectively incorporated in a discharge valve assembly and a suction valve assembly and, which are removably mounted on the housing respectively, whereby, the device can thoroughly be cleansed.

According to further feature of the invention, a plurality of adaptors are provided which are adapted to be mounted on the top of liquid containers having different size and configuration and are adapted to be secured to the housing.

BRIEF DESCRIPTION OF THE DRAWINGS

These and further objects and advantages of the invention will become apparent when reading the following description and referring to the accompanying drawings exemplifying the invention, in which.

DETAILED DESCRIPTION OF THE PREFERRED EMBODIMENTS

Figure 1:
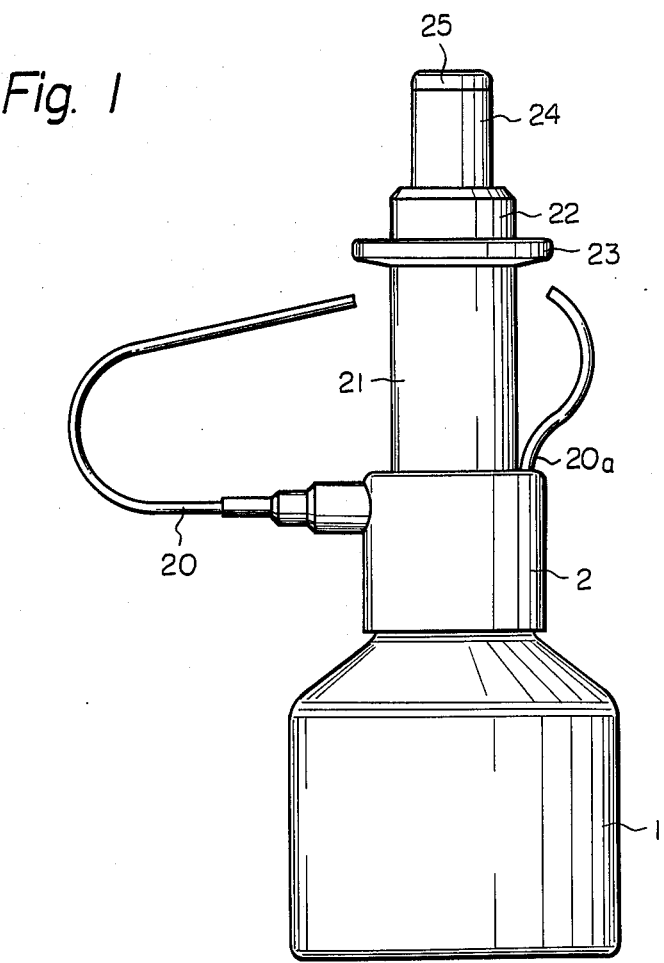
FIG. 1 is a side view of a liquid dispensing device according to the invention.
Figure 3:
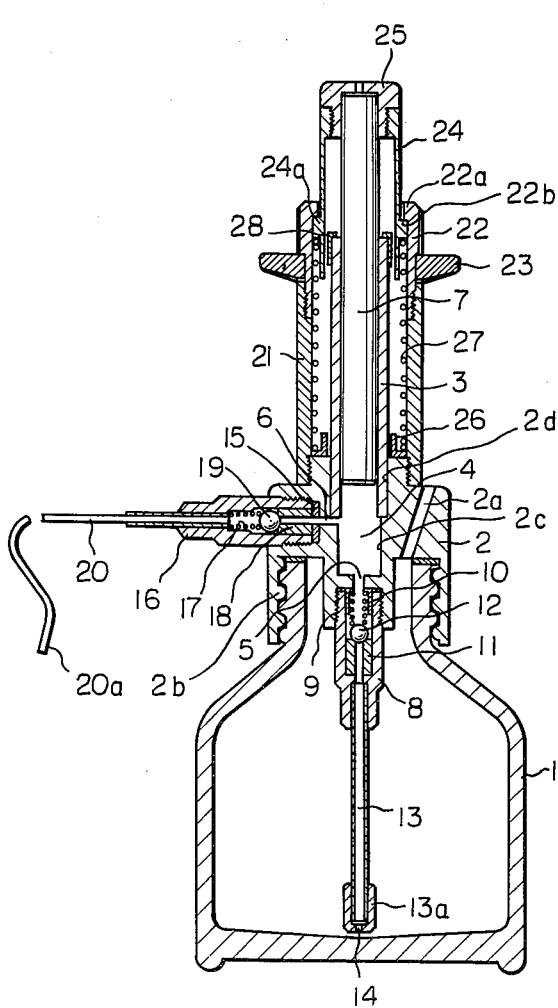
FIG. 3 is a longitudinal section of the liquid dispensing device.

Referring particularly to FIGS. 1 and 3, the liquid dispensing device comprises a housing 2 screw-threadingly mounted on the top of a liquid container or a bottle 1. A glass cylinder 3 is mounted on the housing 2 and slidably receives therein a plunger 7 which is preferably formed of ceramic material. The lower end of the cylinder 3 is forcibly received in a bore 2d of the housing 2 and, the bore 2d is contiguous to a coaxial bore 2c the diameter of which is smaller than the bore 2d but is larger than the inner diameter of the cylinder 3. Thus, a cylindrical space 4 according to the invention is defined by the bore 2c of the housing 2. The lower end of the space 4 is communicated with a suction valve through a vertical passage 5, and the upper end of the space 14 is communicated through a transverse passage 6 with a discharge valve.

The stroke of the plunger 7 is determined such that the lower end of the plunger 7 projects out of the lower end of the cylinder in the downward stroke and takes a position adjacent to the lower end of the space 4 in its lowermost position, and an annular space is formed between the plunger 7 and the bore 2c. Since the passage 6 is formed on the upper end of the space 4, the air contained in the cylinder 3 and in the space 4 in the initial stage of the actuation of the plunger 7 will reliably be exhausted through the passage 6 after the lower end of the plunger 7 has projected from the lower end of the cylinder 3. Therefore, the air removing or bleeding operation can easily be performed and the liquid can throughly be filled in the device by a very small number of strokes.

The construction described heretofore is based on the essential feature of the present invention, however, the dispensing device illustrated in the drawing comprises further features which will hereinafter be described. A suction valve assembly is removably mounted on the housing 2 and comprises a casing 8 receiving therein a ball valve 12 normally biased against a valve seat 11 by a spring 10. The outer end of the spring 10 is retained by a retainer 9. A suction tube 13 is connected to the lower end of the casing 8, and a filter holder 13a supporting a filter 14 is mounted on the tip end of the suction tube. The discharge passage 6 is conducted with a discharge valve assembly which comprises a casing 16 screw-threadingly mounted on the housing 2, a ball valve 19, a valve seat 18 and a spring 17. A nozzle pipe 20 is connected to the casing 16 and the tip end 20a is adapted to be inserted into a through hole 2a formed in the housing 2.

Thus, when the plunger 7 is moved upward liquid in the container 1 is sucked through the inlet tube 13 and through the suction valve into the space 4, and when the plunger 7 is moved downward the liquid in the space 4 is discharged through the discharge valve and the nozzle pipe 20 to the outside of the dispensing device.

On the upper portion of the housing 2 a sleeve 21 is mounted coaxially with the cylinder 3. And an annular cap 22 is screw-threadingly connected to the upper end of the sleeve 21. On the inner circumference of the cap 22 there is formed an annular flange 22a defining a downwardly facing annular shoulder acting as a stop 22b.

A push button 25 is secured to the upper end of the plunger 7 and a generally cylindrical plunger holder 24 is secured to the push button 25. A flange 24a formed on the outer circumference of the plunger holder 24 for cooperating with the stop 22b of the cap 22. The flange 24a also acts to engage with the upper end of a coil spring 27 so as to bias the plunger 7 in the upward direction. The lower end of the spring 27 engages with an annular retainer 26. On the upper end of the cylinder 3 there is provided a pad 28 preventing the direct contact between the cylinder 3 and the plunger holder 24 or the push button 25.

A generally disc-shaped large diameter member 23 acting as a finger holding strip is secured on the sleeve 21 by means of the cap 22, whereby the device shown in the drawings can be handled by a single hand.

Figure 5:
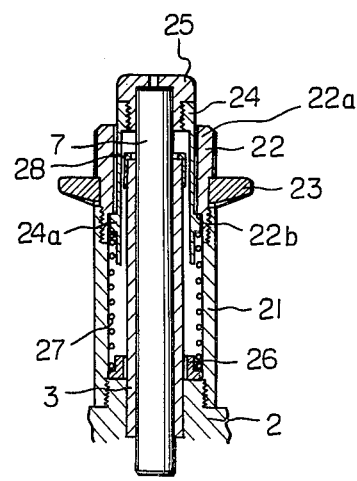
FIG. 5 is a partial sectional view of the liquid dispensing device having a modified cap.

FIG. 5 illustrates a modified form of the cap 22 wherein the axial height or the thickness of the annular flange 22a is increased so as to change the axial position of the stop 22b, whereby the stroke of the plunger 7 is decreased as compared with the embodiment of FIG. 3.

By depressing the push button 25 the plunger 7 moves downward and when the push button 25 is released the plunger 7 moves upward by the spring 27 until the flange 24a abuts with the stop 22b. The stroke of the plunger 7 can be determined by the axial position of the stop 22b.

In the embodiments, the stroke of the plunger 7 can be adjusted by exchanging the cap 22, however, the stroke may be adjusted by exchanging the disc shaped member 23.

Preferably, the members constituting the dispensing device are formed respectively of the following materials:

| | |
|---|---|
| housing 2 | Fluoroethylene polymer such as Diflon (Trade Mark) |
| Cylinder 3 | hard glass |
| plunger 7 | ceramic |
| casings 8 and 16 | same to casing 2 |
| inlet tube 13 | Fluoroethylenepolymer such as Teflon (Trade Mark) |
| balls 12 and 19 | same to plunger 7 |
| valve seats 11 and 18 | same to plunger 7 |
| nozzle tube 20 | same to inlet tube 13 |
| sleeve 21 | poly-propylene |
| cap 22 | poly-propylene |
| disc shaped member 23 | poly-ethylene |
| plunger holder 24 | same to sleeve 21 |

Figure 2:
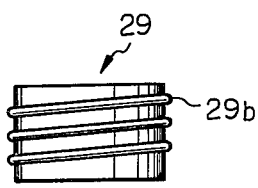
FIG. 2 is a side view of an adaptor.
Figure 4:
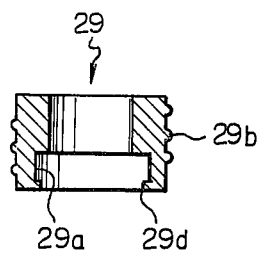
FIG. 4 is a longitudinal section of the adaptor.

FIGS. 2 and 4 show an adaptor 29 which is used with a bottle without having screw-threads on the top thereof. A bore portion 29a is fitted on the top of the bottle and screw-threads 29b are formed on the outer circumference of the adaptor 29 for engaging with the internal screw-threads 2b of the housing 2 of the dispensing device of the invention. A projection 29d is formed on the lower end of the bore portion 29a so as to assure the engagement between the adaptor 29 and the bottle.

The construction and the configuration of the adaptor are not limited to the embodiment of FIGS. 2 and 4 and, various modifications may easily be effected according to the construction and configuration of respective bottles.

As described heretofore, a cylindrical space having the inner diameter slightly larger than that of the cylinder is, according to the invention, formed contiguous to the lower end of the cylinder and coaxially therewith so as to receive the lower end of the plunger when the plunger is at the lowermost position, and the upper end of the space is connected to the discharge valve, whereby air in the cylinder is substantially thoroughly exhausted therefrom in the initial stage of the operation. Therefore, any air bubbles will not remain in the cylinder, and a predetermined quantity of liquid can reliably be dispensed.

What is claimed is:

1. A liquid dispensing device including a housing adapted to be mounted on the top of a liquid container such as a bottle, a cylinder vertically mounted on the housing, a plunger slidably disposed in the cylinder with the upper end of the plunger projecting out of the upper end of the cylinder, a suction valve disposed in an introducing passage for introducing liquid in the container into the cylinder when the plunger moves in the upward direction, a discharge valve disposed in a discharge passage for discharging liquid in the cylinder when the plunger moves in the downward direction, and means for restricting the upward movement of the plunger, wherein the improvement comprises in that a cylindrical space having the inner diameter slightly larger than that of the cylinder is formed continuous to the lower end of the cylinder and coaxially with the cylinder, said plunger being of such length relative to said cylindrical space that said plunger extends fully into said cylindrical space at the downwardmost extent of its travel therein and whereby the resulting annular space between said cylindrical space and said plunger when the latter is in its downwardmost position within said cylindrical space is such that air in said space is substantially thoroughly exhausted therefrom in the initial downward movement of said plunger into said cylindrical space, and a normally extending transverse passage is formed to connect the inlet of the discharge valve and the upper end portion of the cylindrical space to thereby permit said thorough exhaustion of air through said passage, and wherein said suction valve and said discharge valve are respectively incorporated in a suction valve assembly and discharge valve assembly, said assemblies being threadingly and removably mounted on the housing respectively, a sleeve coaxially surrounding said cylinder and having a lower end secured to said housing, an annular cap having an annular shoulder on the inner periphery thereof is removably mounted on the upper end of said sleeve, said annular shoulder acting as a stop restricting the upward movement of the plunger, and said cap being exchangeably selected from a group of similar parts respectively having annular shoulders at respective locations so as to selectively determine the maximum stroke of the plunger.

* * * * *